United States Patent [19]
Jurrius et al.

[11] Patent Number: 5,472,549
[45] Date of Patent: Dec. 5, 1995

[54] APPARATUS FOR ELECTRONICALLY SEAM FUSING DISSIMILAR POLYMERIC MATERIALS

[75] Inventors: Eran J. P. Jurrius; Robert L. Karam, Jr., both of Akron, Ohio

[73] Assignee: Enclosure Technologies, Inc., Sharon Center, Ohio

[21] Appl. No.: 273,091

[22] Filed: Jul. 8, 1994

[51] Int. Cl.⁶ ...................................................... C09J 5/00
[52] U.S. Cl. .................. 156/311; 156/583.1; 156/583.2; 156/583.4; 156/358; 156/359; 156/498
[58] Field of Search ........................... 156/583.2, 583.4, 156/583.3, 583.1, 358, 498, 64, 359, 311

[56] References Cited

U.S. PATENT DOCUMENTS

| | | | |
|---|---|---|---|
| 3,166,459 | 1/1965 | Imhof | 156/583.2 X |
| 3,360,412 | 12/1967 | James | 156/494 X |
| 3,444,732 | 5/1969 | Robbins et al. | 156/64 X |
| 3,830,681 | 8/1974 | Wilson | 156/583.3 X |
| 3,859,159 | 1/1975 | Carter et al. | 156/583.2 X |
| 3,867,226 | 2/1975 | Guido et al. | 156/583.2 X |
| 3,960,069 | 6/1976 | Bowyer | 156/359 X |
| 3,964,958 | 6/1976 | Johnston | 156/583.3 X |
| 4,108,712 | 8/1978 | Bala et al. | 156/583.2 X |
| 4,273,604 | 6/1981 | Johnston | 156/583.3 X |
| 4,292,118 | 9/1981 | Wyslotsky | 156/583.2 |
| 5,252,171 | 10/1993 | Anderson et al. | 156/359 X |

FOREIGN PATENT DOCUMENTS

| | | | |
|---|---|---|---|
| 3604026 | 8/1986 | Germany | 156/583.2 |
| 1086641 | 10/1967 | United Kingdom | 156/583.2 |

*Primary Examiner*—David A. Simmons
*Assistant Examiner*—Steven J. Helmer
*Attorney, Agent, or Firm*—Renner, Kenner, Greive, Bobak, Taylor & Weber

[57] ABSTRACT

A device for electronically seam fusing similar or dissimilar multiple polymeric materials by placing the materials between two opposing plates, wherein the plates have cooling tubes disposed within the plates and have the required combination of heating elements, non-stick heat barriers, and configuration enhancers disposed thereon. The opposing plates are then closed by a force which is regulated by a control feature which also governs the timing, length and temperature that is utilized by the heat elements and cooling tubes of the invention. Upon completion of the electronic seam fuse cycle, the multiple layers of polymeric materials will be fused together, and separated if desired, thus creating a seam that will be as strong or stronger than the individual material.

18 Claims, 6 Drawing Sheets

FIG.—2A
FIG.—2B
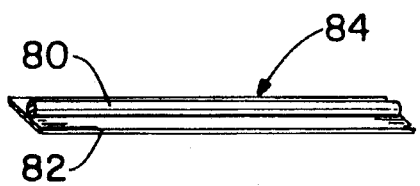
FIG.—2C
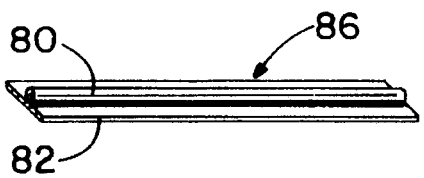
FIG.—2D
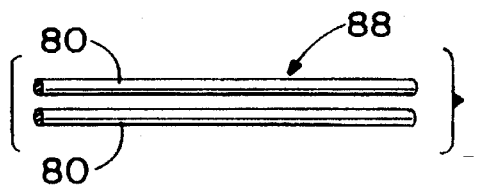
FIG.—2E
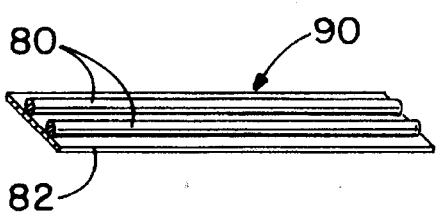
FIG.—2F
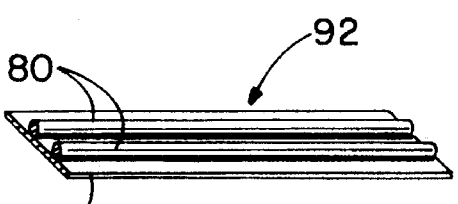
FIG.—2G
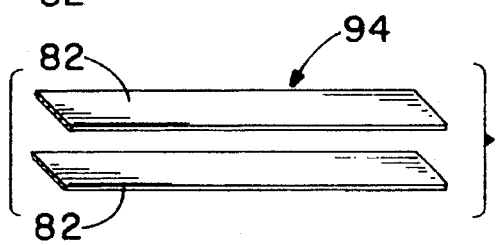
FIG.—2H

APPARATUS FOR ELECTRONICALLY SEAM FUSING DISSIMILAR POLYMERIC MATERIALS

TECHNICAL FIELD

The invention herein resides in the art of seam fusing materials and in particular electronically seam fusing polymeric materials. Specifically, the invention relates to electronically seam fusing multiple similar or dissimilar polymeric materials to form a melt bond that preserves the molecular structure of the dissimilar materials so that the bonded area is stronger than the materials themselves.

BACKGROUND ART

People have sought facile and reliable means to join flat flexible materials together to form such items as clothing, enclosures, bags, tents, balloons and the like. Early civilizations used crude forms of needles and threads to join materials together. More recently, sewing machines have provided a fast and reliable means to join two or more materials together. Sewing machines are known to provide a secure attachment between materials that is very strong and pleasing to the eyes. With the advent of adhesives, flat flexible materials can now be glued together to achieve a secure bond. One advantage that adhesives have over sewing is that a gas-tight and water-proof seal may be achieved. This type of seal is especially useful in the storage of food and in the manufacture of water-proof clothing. Unfortunately, adhesive type seals will degrade over a period of time and may break due to fluctuations in temperature and physical stress at the seal. Normal sewing techniques may provide a stronger connection between two materials; however the needle will leave pin holes in the material thus preventing the possibility of a gas tight seal.

With the introduction of thermoplastic and polymeric materials, attempts have been made to fuse two or more of these type materials together by applying pressure to the areas desired to be joined, and then applying heat to those pressure points until the materials melt together, creating a melt bond. Melt bonds provide a good seal that is gas-tight and water proof and has a reasonable amount of strength associated therewith. However, unless precise controls are maintained with respect to the fusing process variables, a poor seam may result. For example, if uneven pressure is applied to the materials to be fused, a weak or intermittent seal will be created, thereby affecting the quality of the seal.

Prior art has attempted to control the many variables involved in seam fusing thermoplastic materials together. In particular, U.S. Pat. No. 4,555,293 by French teaches the use of equipment that requires selecting the proper dimensions for the heating elements to be placed in a specific type die, the die being mateable with a matching recess in an opposite die, wherein the dimensions of the heating elements, recess and mating dies must be correlated to the thickness and compression characteristics of the thermoplastic sheet material to be bonded. Although useful, the French patent is limited in several respects.

In particular, the French patent only discloses the ability to thermobond two similar thermoplastic materials together. Additionally, the French apparatus is limited in only bonding thermoplastic materials, whereas the present invention is able to bond dissimilar polymeric materials together.

Those skilled in the art will appreciate that a thermoplastic material is limited to those materials having the property of softening when heated and becoming rigid again when cooled, without undergoing any appreciable chemical change to the material itself. In contrast, a polymeric material, of which thermoplastic material is a subset, is classified as a natural or synthetic chemical compound or mixture of compounds formed by a chemical reaction in which two or more small molecules that contain repeating structural units of the original molecules and that have the same percentage composition as the small molecules are lined together to form a stable material. Some polymeric materials, such as rubber, will undergo appreciable chemical change if heated past their melting points and then cooled. A polymeric material can either be woven, like a cloth, or non-woven, like a film.

Accordingly, there is a need in the art for an apparatus and method for electronically seam fusing multiple layers of dissimilar polymeric materials to form a molecular bond that is stronger than the individual materials.

DISCLOSURE OF INVENTION

In light of the foregoing, it is a first aspect of the invention to provide an apparatus for electronically seam fusing multiple dissimilar polymeric materials.

It is another aspect of the present invention to electronically seam fuse multiple dissimilar polymeric materials to create a molecular bond among the dissimilar materials such that the bond is stronger than the material itself.

It is yet another aspect of the present invention to provide an electronically seam fused bond that is aesthetically pleasing, superior in strength and cost effective when compared with other fastening or sealing procedures.

It is still another aspect of the present invention to provide a method for electronically seam fusing multiple dissimilar polymeric materials.

It is a further aspect of the present invention to provide a method for electronically seam fusing multiple dissimilar polymeric materials where the functions of applying pressure, heating, cooling, and dwell time are controlled electronically.

It is still another aspect of the present invention to electronically seam fuse two adjacent seals, with a tear region in between so that when the two adjacent seals are separated they will remain intact.

Another aspect of the present invention is to provide an apparatus wherein the functions of applying pressure cooling, heating and dwell time are controlled independently of each other.

A further aspect of the present invention is to provide a sealing apparatus that can easily be configured into any shape desired.

At least one or more of the foregoing objects, together with the advantages thereof over the known art relating to seam fusing devices, which shall become apparent from the specification which follows, are accomplished by the invention as hereinafter described and claimed.

The foregoing and other aspects of the invention which will become apparent as the detailed description proceeds are achieved by an apparatus for electronically seam fusing similar and dissimilar polymeric materials, comprising: a first plate; a second plate spaced apart from said first plate, there being polymeric materials disposed therebetween; and closure means applied to said first and second plates so that said polymeric materials are fused together after said closure means is opened.

The present invention also provides a method for electronically seam fusing polymeric materials which comprises the steps of inserting polymeric materials between first and second plates; closing said first and second plates upon said polymeric materials for a predetermined period of time, thereby fusing said materials together; opening said first and second plates; and removing said seam fused materials.

BRIEF DESCRIPTION OF THE DRAWINGS

FIGS. 2A–H illustrate some of the possible combinations of heating elements that may be utilized in the apparatus for electronically seam fusing.

BEST MODE FOR CARRYING OUT THE INVENTION

Figure 1:
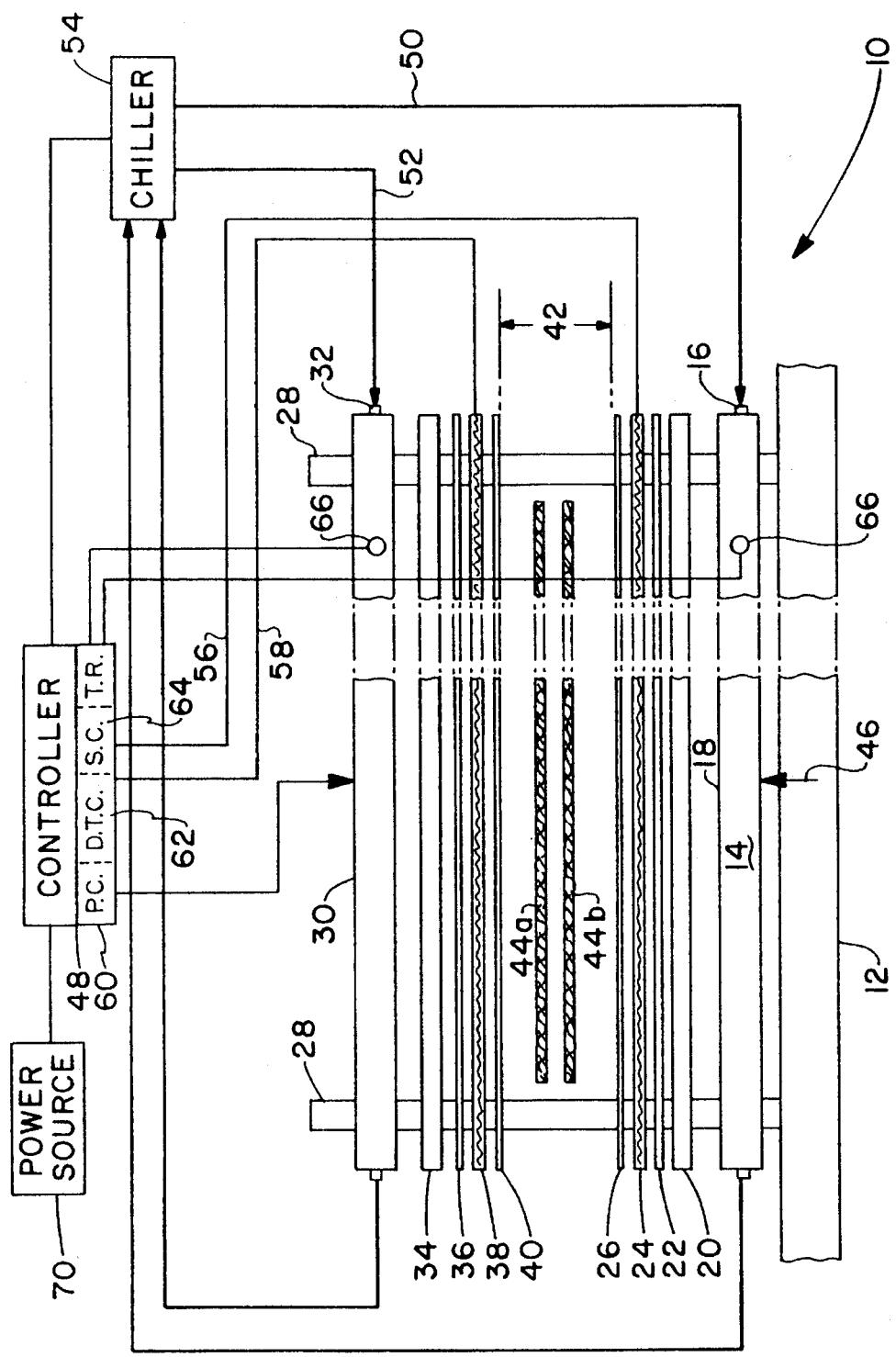
FIG. 1 is an elevational view diagrammatically illustrating an apparatus for electronically seam fusing similar and dissimilar polymeric materials.

Referring now to the drawings and more particularly to FIG. 1, it can be seen that an apparatus for electronically seam fusing similar and dissimilar polymeric materials is designated generally by the numeral 10. The device includes a base 12 which supports a plate 14 having a cooling tube 16 disposed therein and having a surface opposite the base 12 designated as a material side 18. Disposed on the material side 18 is a configuration enhancer 20, which has disposed thereon a primary heat barrier 22, a heating element 24, and a secondary heat barrier 26. A minimum of one, but preferably a plurality of alignment posts 28 may be mountably secured to said base 12, with the plate 14 slidably mounted to the posts.

Spaced apart from and opposed to the first plate 14 is a corresponding plate 30. In a construction similar to the plate 14, the corresponding plate 30 has a cooling tube 32 disposed therein. Disposed on the side of the corresponding plate 30 facing the plate 14, will be a configuration enhancer 34, a primary heat barrier 36, a heating element 38, and a secondary heat barrier 40.

As those skilled in the art can appreciate, the area between the plate 14 and the plate 30 forms an opening 42. Multiple dissimilar or similar polymeric materials 44 are disposed within the opening 42. A closure force 46 is then applied to the plate 14 and the plate 30 to hold the materials 44 while they are being fused. A system of controls 48 governs the amount of pressure applied and the length of time the closure force 46 is engaged upon the materials 44.

While the closure force 46 is being applied to the materials 44, the controls 48 simultaneously regulate a cooling tube flow 50 to the cooling tube 16, and a cooling tube flow 52 to the cooling tube 32. A chiller 54, regulated by the controls 48, regulates the flow and the temperature of coolant to the tubes 16 and 32. Usually, the coolant contained within the tubes 16 and 32 will comprise a polyglycol/water mixture or 100% polyglycol. Other similar type substances may be used to obtain the cooling temperature desired. Additionally, the controls 48 simultaneously regulate a heat flow 56 to the heat element 24, and a heat flow 58 to the heat means 38. As implied earlier, the controls 48 contain a pressure controller 60, a dwell time controller 62, and a start cycle button 64. A temperature sensor 66 is located on each plate 14 and 30 and is operatively connected to the controls 48 to further regulate the temperature at the plates. The controls 48, and thus the seam fuser 10, are operatively powered by a power source 70.

As those skilled in the art can appreciate, the plate 30 is slidably mounted to the alignment post 28 such that when the closure force 46 is applied to the polymer materials 44, the plate 14 and the plate 30 are properly aligned so that the correct pressures and temperatures may be applied.

Referring now to FIGS. 2A–H, those skilled in the art will appreciate that various types of heating elements may be used to properly perform the heat fusing of the dissimilar polymeric materials. FIG. 2A illustrates a wire heating element which may be disposed on either the primary heat barrier 22 or 36 or on the configuration enhancers 20 or 34. Furthermore, a secondary heat barrier 26 or 40 may be disposed over the wire. The wire heating element 24, 38 may also be varied with respect to its diameter and type of material. Typically, a nichrome wire or any other wire that can be heated and cooled very quickly will be used. As those skilled in the art will appreciate, the heating elements are inductively heated, that is the temperature of the element is raised or lowered by increasing or decreasing the amount of current conducted through the element. Accordingly, the heating elements are made up of a metal alloy that can repeatedly withstand large swings in temperature without undergoing elongation or deformation so as to adversely affect the integrity of the seam fusing process.

Instead of using a wire element, the types of dissimilar polymeric materials to be fused may require the use of a ribbon type heating element 82, as shown in FIG. 2B. As indicated earlier with the wire element 80, the ribbon element 82 may be used in conjunction with either configuration enhancer 20 or 34 or with the primary and secondary heat barriers 22, 36, 26, or 40.

Furthermore, depending on the materials to be fused and configuration desired, the heating elements 24 or 38 may be made up of any combination of wires and ribbons. For example, FIG. 2C illustrates a wire 80 loosely placed on a ribbon 82, the configuration being generally designated as 84. If required by the dissimilar materials, the wire 80 may be brazed or soldered to the ribbon element 82 as shown in FIG. 2D as configured 86. Other combinations include, but are not limited to multiple wires 80 (FIG. 2E) shown as 88, multiple wires 80 loosely disposed on a ribbon 82 (FIG. 2F) shown as 90, multiple wires 80 brazed or soldered to a ribbon 82 (FIG. 2G) shown as 92 or multiple ribbons (FIG. 2H) shown as configuration 94.

In addition to the heating elements 24 or 38 being made up from any type of combination of wires 80 or ribbons 82, the heating elements may be configured in any three dimensional shape that is required for the desired application. For example, the heating element may be configured in the shape of a glove or a coverall suit. Also, if the application requires that an intermittent seal be created, the heating means may be configured as such. Typically, the various heating configurations shown in FIG. 2 will be utilized to create the desired seal.

Therefore, in actual operation, the dissimilar polymeric materials 44 are placed into the opening 42 between the plates 14 and 30. Depending upon the finished requirements of the seal, the materials may be held tautly or loosely in the opening. Following this, the operator of the apparatus activates it by pressing the start cycle button 64. This activates the closure force 46, thus drawing the two plates 14 and 30 together to secure the materials 44 within the apparatus. The pressure controller 60 will apply just enough force to ensure that the heating elements 24 and 38 along with the cooling elements 16 and 32 are in their required position. The closure may be effected by any of numerous means, such as pneumatic or hydraulic pistons, solenoids, worm screws, or the like.

The configuration enhancers 20 and 34 are usually a pliant material that provides total surface contact between the polymeric materials and the heating elements and/or the cooling elements to allow effective application of a preselected seam fusing program. Typically, the material used as a configuration enhancer will have a very high heat resistance with a soft durometer such as foam silicon rubber, although other similar materials may be used. The total surface contact of the configuration enhancers 20 and 34 ensures that there is an even distribution of heat and pressure to the materials to be fused. Depending upon the requirements of the application, it is possible that only one configuration enhancer will be disposed on only one of the plates.

Prior to the closure force 46 being effected by the controls 48, the controls activate the chiller 54 to direct the cooling flow 50 and 52 into the cooling tubes 16 and 32 respectively. The cooling temperature will be set at a predetermined level prior to the heating cycle being engaged. Once the heating cycle is engaged, the controls 48 then reduce the amount of cooling flow until the heat cycle is over. At this time, the cooling flow is controlled so as to be synchronous with the curing curve of the polymer material or film being seam fused. It is very important for the cooling tubes 16 and 32 to be in close proximity to the heating elements 24 and 38 to ensure that a proper seam fuse of the polymeric materials is realized. To ensure that the proper cooling temperature is maintained within the cooling tubes 16 and 36, input from the temperature sensors 66 will provide input to the controls 48. It should be noted that the cooling mechanism will only be used as required by the materials 44 to be fused. Therefore, it is conceivable that both cooling tubes 16 and 32 could be utilized or that both could be disengaged. Also, only one of the cooling tubes 16 or 32 in either plate 14 or 30 could be operated.

Typically, the heating cycle will only be engaged once the pressure controller 62 and the cooling temperatures have reached their predetermined levels. The temperatures of the heating cycle are based upon several factors. In particular, the heating, cooling and curing characteristics of the materials to be fused are critical in controlling the fusing process. It should be noted that polymeric materials have a first softening temperature where the material starts to become deformable, and a second higher melt temperature at which the material melts such that it can be molecularly cross-linked and fused with similar or dissimilar materials. Two dissimilar materials such as nylon 44a and polyethylene 44b will have correspondingly different characteristic softening and melting temperatures. For example, nylon 44a softens at 316° F. and melts at 320° F., while polyethylene 44b softens at 195° F. and melts at 215° F.

Therefore, to effectively seam fuse dissimilar materials, the controls 48 first pre-heat the elements 24 and 38 to a temperature at or below the lowest softening temperature of the material requiring the least amount of heat. The controls 48 are programmed so that the heating elements will first rise to a pre-heat level that is at a point at or below the lowest softening point temperature. In the case of seam fusing nylon 44a and polyethylene 44b, this temperature will be at or below 195° F. for polyethylene 44b. To form a pure melt bond, the heating element 38 is then very quickly raised to the highest temperature required, which in this case is 320° F. to melt the nylon 44a, within milliseconds the heating element 24 will be cycled such that it will melt the polyethylene 44b at 215° F. For an effective molecular bond to be created, it is imperative that the higher temperature nylon 44a material have completed its melt cycle and that the element 38 be in a cooling stage while the controls activate the heat element 24 to melt the lower temperature material polyethylene 44b. It should further be appreciated that it is feasible for a single heat element 24 to be provided the required cycling of temperatures to bond multiple dissimilar materials.

The pre-heating, heating, cooling, heating, cooling stages of this process must all take place within milliseconds for a proper bond to be created. Of course, the dwell time of the apparatus is very dependent on the materials to be fused. The entire heating and cooling process is electronically programmed at the controls 48 to ensure the proper sequence of events. The electronic process is programmable such that a single heating element may be cycled as required or so that multiple heating elements are cycled as demanded by the materials to be fused. Likewise, the activation of the cooling process is controlled in the same manner. The cooling process is critical so that the molecules of the multiple layers of polymeric material will congeal into a solid molecular configuration that will result in a material without any weak or thinning characteristics immediately next to the seam fused area. The seam fused area may also have to pass through a curing cycle depending upon the types and number of polymer layers present. The usual cycle time for electronically seam fusing dissimilar materials is between 1.25 seconds to 12 seconds, however; the curing cycle may take as long as eight hours.

Figure 5A:
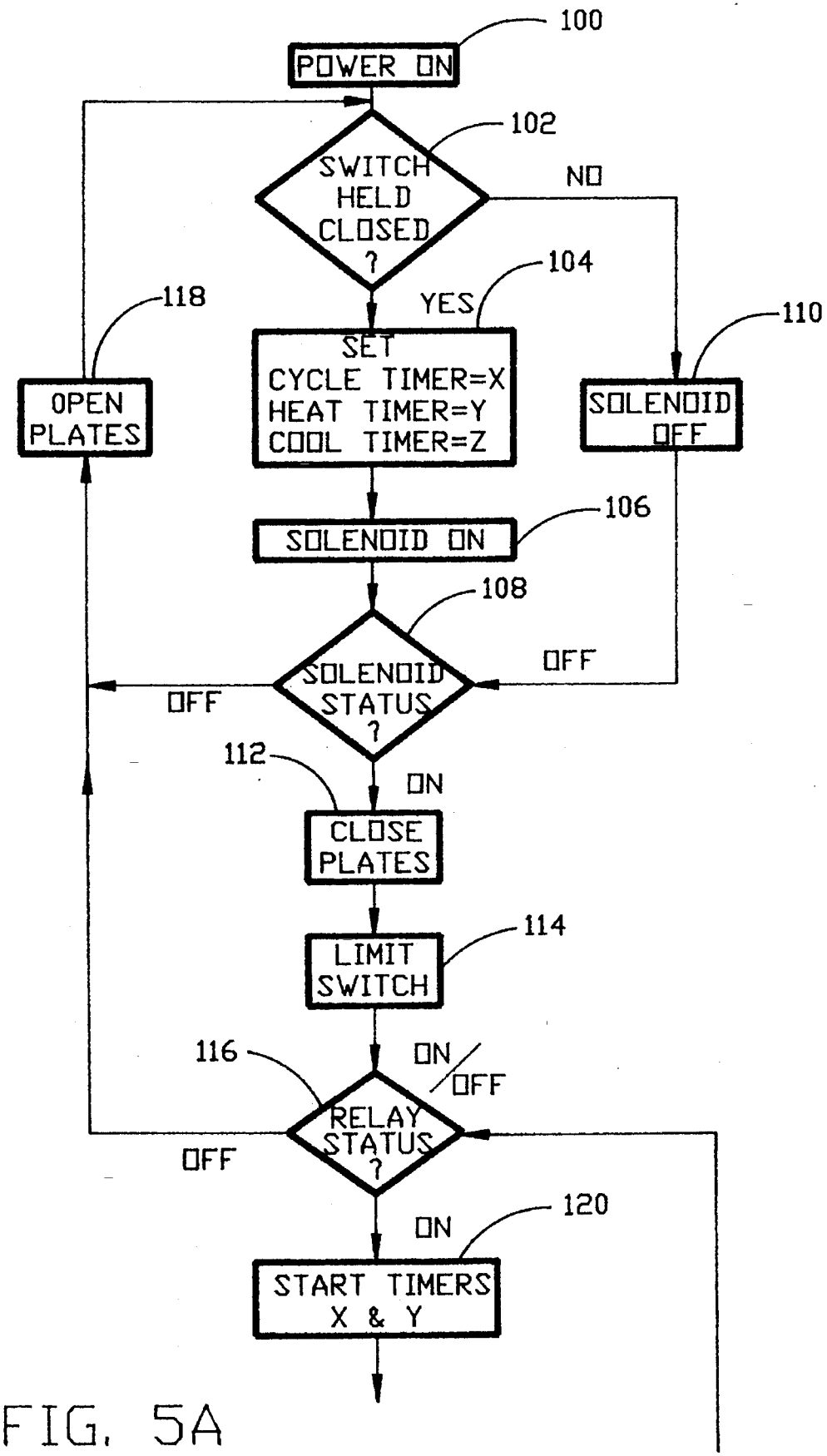
FIGS. 5A through C illustrate a flow chart depicting the overall sequential process for operating the controls of an electronic seam fuser.
Figure 5B:
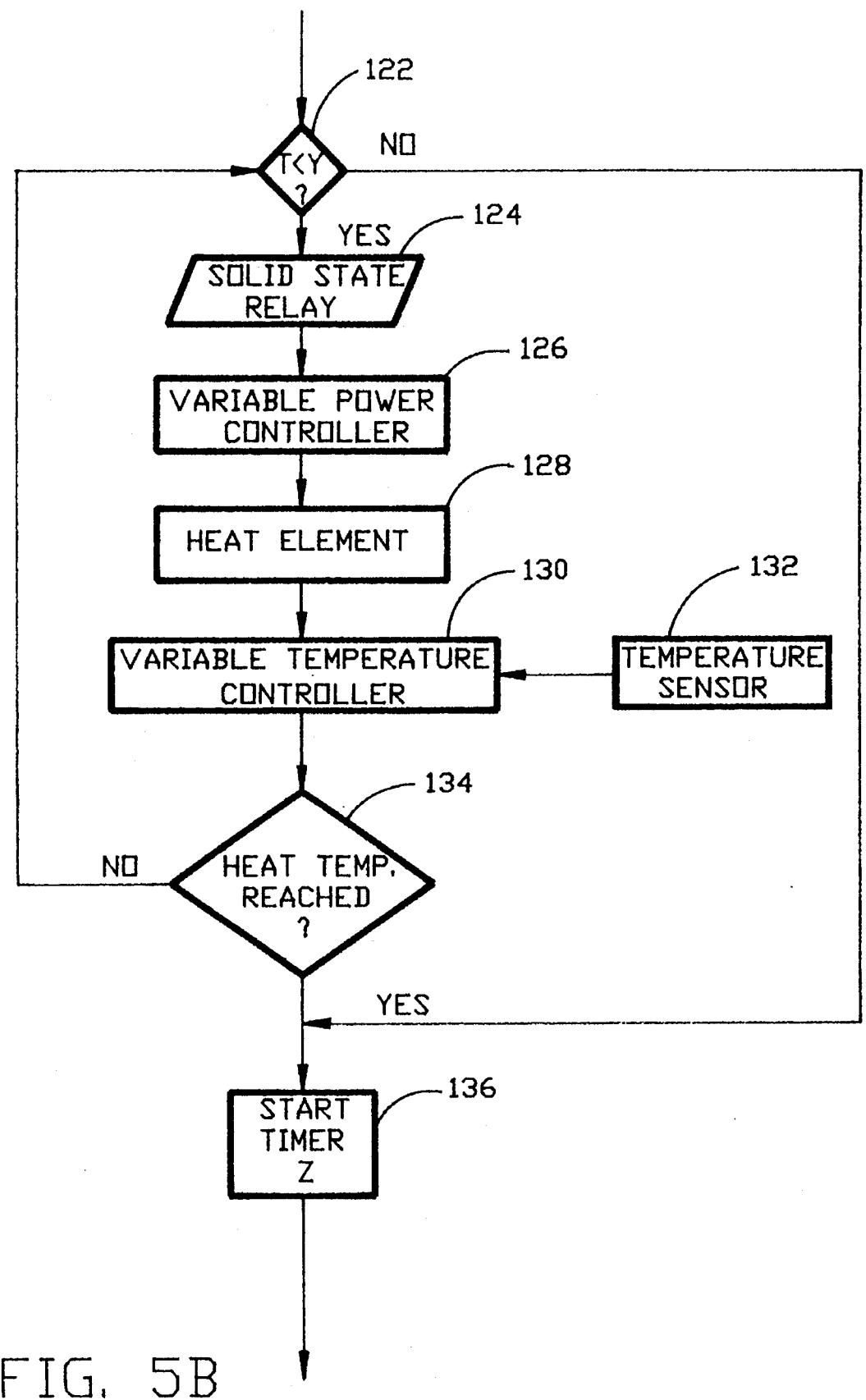
Figure 5C:
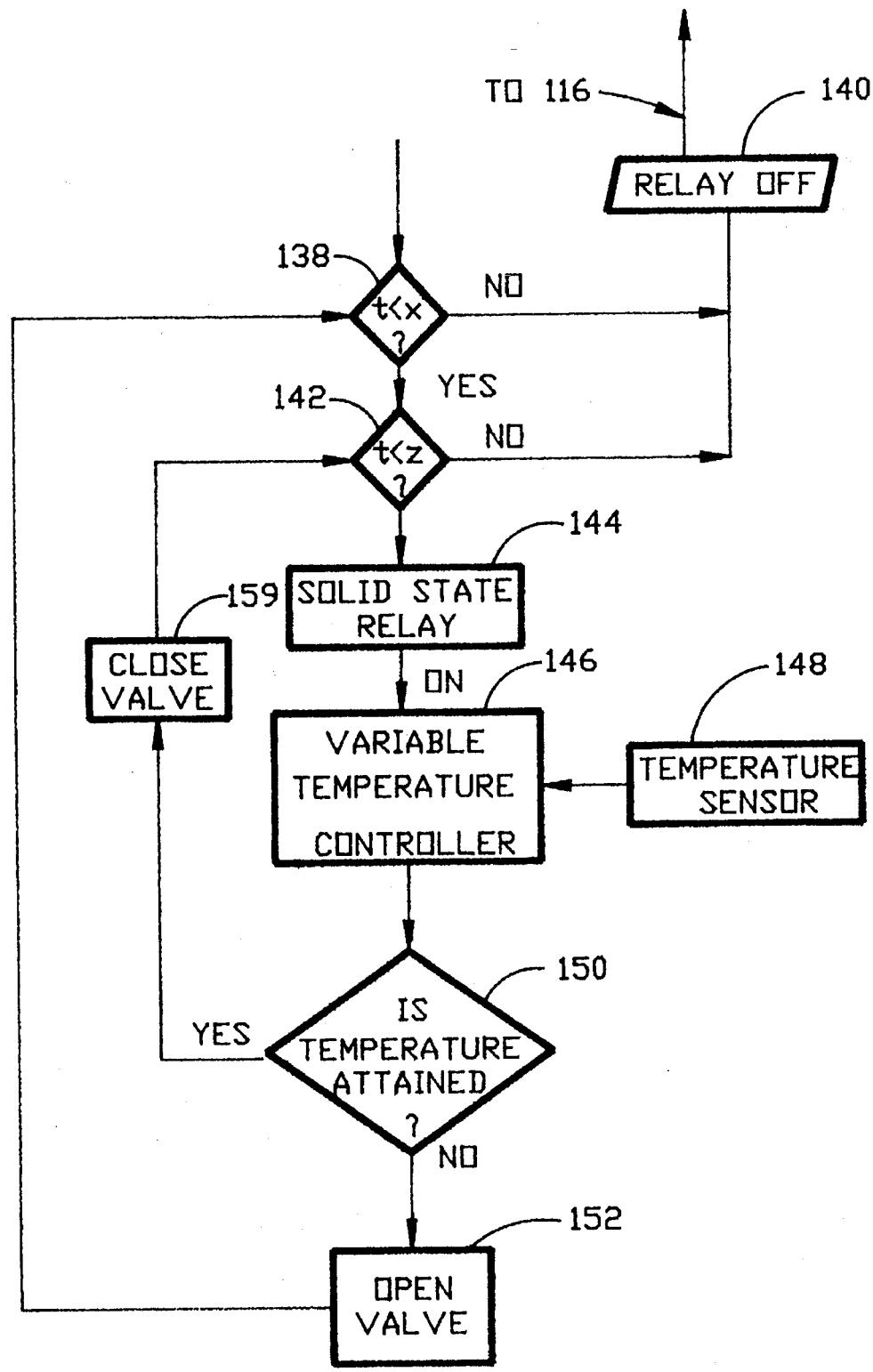

Referring now to FIGS. 5A–C, an exemplary process is illustrated which shows the sequential process of the electronic seam fuser 10 as it proceeds through the overall curing, heating, and cooling cycles. It will be appreciated that this exemplary process could be expanded and modified into any number of combinations or variations as needed depending upon the various types and of polymeric materials fused. Initially, at step 100, the power supply 70 is turned on to provide an input power to the electronic seam fuser 10. After power is supplied to the controller 48, at step 102, a cycle switch is closed by the operator. At step 104 the controller 48 sets the various timers required for the operation of the electronic seam fuser 10. Step 104 sets a cycle timer to a value designated by x, a heat timer to a value designated by y, and a cooling timer to a value designated by z. At this time, the controller 48 changes a solenoid register from "off" to "on" at step 106. Subsequently, at step 108, the controller 48 checks the status of the solenoid register. If at any time the cycle switch at step 102 is released, the controller 48 sets the solenoid register to an "off" designation at step 110. Therefore, at step 108, the solenoid status checker deactives the solenoid and changes the solenoid register to "off." Once the solenoid has been activated, the plates 14 and 30 are closed at step 112. To ensure the proper operation of the seam fuser 10, a limit switch is biased to a normally "off" position. At step 114, when the plates 14 and 30 close upon the polymeric materials, the limit switch is biased to the "on" position. At step 116, if the limit switch has not been activated, the controller 48 proceeds to step 118 and opens the plates 14 and 30 and returns the controller 48 to step 100.

If at step 116, the limit switch is activated, a relay is activated so that at step 120 the cycle timer and the heat timer are started. The heating cycle starts at step 122, wherein the controller 48 evaluates whether the heat time has elapsed. If not, the controller proceeds to step 124 to engage a solid state relay which engages a variable power controller at step 126. Accordingly, at step 128, power is provided to the heating elements 24 and 38. At step 130, a variable temperature controller receives input from a temperature sensor at step 132. As discussed previously, the temperature sensor 66 used at step 132 may consist of a thermocouple, a device for measuring the corresponding current or voltage, or an infrared beam. Subsequently at step 134, the controller 48 checks to see if the desired heat temperature has been reached by the heating elements 24 and 38. If the desired heating temperature has not been reached, the controller returns to step 122 to check the status of the heating timer. If the heating timer has not elapsed, the controller 48 repeats steps 124–134. However, if the heating cycle time has elapsed, the controller 48 proceeds to the next step.

At step 136, the cooling timer z is initiated. Subsequently at step 138, the controller 48 checks if the overall cycle time x has elapsed. If so, at step 140, the relay register at step 116 is switched to on "off" position. Accordingly, the controller 48 proceeds to open the plates at step 118. If, however, the overall cycle time has not elapsed, the controller 48 checks the status of the cooling timer z. If the cooling timer z has not elapsed, the controller 48 proceeds to step 144 to turn on a second solid state relay. Accordingly, at step 146 a variable temperature controller monitors the cooling flow 50 and 52 by a temperature sensor at step 148. Subsequently, at step 150, the controller 48 checks to see if the desired cooling temperature has been attained. If so, a valve is closed at step 154 to stop the cooling flow 50 and 52, after which the controller 48 once again checks to see if the cooling cycle time has expired at step 142. If the cooling cycle time has not elapsed, steps 144 through 150 are repeated. If, however, at step 150 the cooling temperature has not been attained, the controller 48 opens the cooling valve at step 152. The controller 48 then returns to step 138 to check the status of the overall cycle timer x. If the overall cycle timer x has not elapsed, the controller 48 proceeds to repeat steps 142–154. Accordingly, if the overall cycle timer x has elapsed, the controller 48 proceeds to turn the relay off at step 140 and open plates 14 and 30 of the electronic seam fuser 10.

Those skilled in the art will appreciate that the flow chart described hereinabove can be added to or modified to accommodate varying types and thicknesses of polymeric materials. Furthermore, the variable timers which set the cycle time x the heat time y and the cooling time z could be replaced with fixed timers if it is known that the electronic seam fuser 10 is only going to be fusing specified types and quantities of polymeric materials. Moreover, it is apparent that by precisely controlling the variable cycle times a strong molecular bond is provided.

Figure 3:
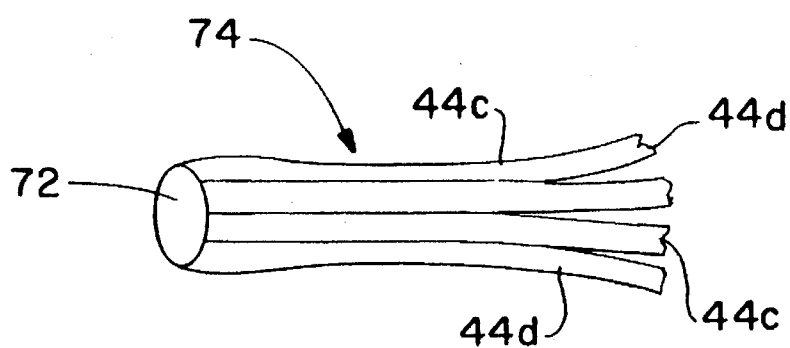
FIG. 3 illustrates a molecular bond exemplary of a seam fusing process utilizing the imprecise controls of the prior art.
Figure 4:
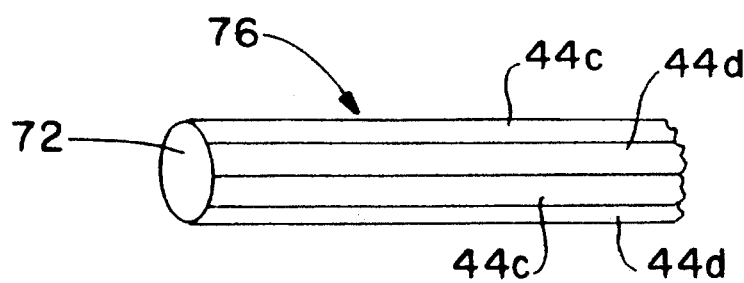
FIG. 4 illustrates a molecular bond exemplary of the seam fusing process of the present invention.

For example of a weak molecular bond and a strong molecular bond are illustrated in FIGS. 3 and 4. In particular, FIG. 3 shows a molecular bond area 72 where two dissimilar polymeric materials 44c and 44d were fused together. Due to the imprecise control of the heating, cooling, and pressure functions a weak joint area 74 will be formed. This is especially true when the heating element is placed within a cavity disposed within one of the plates, and the corresponding plate has a corresponding cavity where the material is to flow as the materials are heated. By requiring the material to flow to a cavity, the materials are put under additional stress, which can result in the weak melt bond area. A weak melt bond will result in the area next to the fuse not being as strong as the individual materials that were fused.

FIG. 4 is similar to FIG. 3 in that a molecular bond 72 joins together two dissimilar polymeric materials 44c and 44d. Due to the precise controls of heating, cooling and pressure, a strong joint area 76 will be formed. By disposing the polymeric materials 44c and 44d between a heating element 24 or 38 and the configuration enhancers 20 and 34, as the polymeric material is softened and then instantaneously melted, no undue stress is applied to the materials to create a weak joint area. Therefore, a melt bond is created (not a mechanical bond) wherein the molecular structure of each individual polymeric material is preserved, but where the molecular structure of each individual material is interleaved with the other materials.

A further feature of the present invention is that the heat barrier materials 22, 26, 36 and 40, have a non-adherent property so that when a polymeric material is raised to its melting temperature, the polymeric material will not stick to the heating elements 24 and 38 or the plates 14 and 30 as the closure force is withdrawn from the materials to be fused. The heat barrier materials 22, 26, 36, and 40 also serve to ensure that an even and effective transfer of heat is conducted from the heating elements to the multi-layer polymer materials to be so fused. Typically, the heat barrier material will be made of fiberglass, Teflon (TM of Dupont), silicone, or some other similar type material.

As those skilled in the art will appreciate, the present invention allows for the electronic seam fusing of dissimilar or similar polymeric materials which may be in the form of a woven, non-woven or film material. These different forms may appear as a laminated polymer configuration in either heterogeneous or homogeneous mix. For example, a woven polymer material may be laminated to a heterogenous or homogeneous non-woven or film polymer as one of the materials to be seam fused to a similar or dissimilar polymeric material. These materials may contain multiple layers of heterogeneous polymers with a wide range of softening and melting temperatures. The electronic seam fusing of these materials will create a bond that is as strong or stronger than the original materials themselves. Some of the polymer layers that may be utilized are very fragile; however, the present invention can seam fuse these fragile materials to other, stronger polymeric materials without altering their molecular composition and thus allowing the fragile materials to function as they were intended and as part of a finished product.

Thus it can be seen that the objects of the invention have been satisfied by the structure presented above. It should be apparent to those skilled in the art that the object of the present invention can be practiced with any type of polymeric material, similar or dissimilar, in any number of multiples and in any desired shape.

While a preferred embodiment of the invention has been presented and described in detail, it will be understood that the invention is not limited thereto or thereby. Accordingly, for an appreciation of the true scope and breadth of the invention, reference should be made to the following claims.

What is claimed is:

1. An apparatus for electronically seam fusing polymeric materials, comprising:

a first plate having a first heating means;

a second plate spaced apart from said first plate and defining an opening therebetween for receiving polymeric materials therein, said second plate having a second heating means;

closure means interconnected to said first and second plates for closing said plates upon said polymeric materials and fusing such materials together during such closure; and control means for selectively activating and cycling said first heating means to a first maximum temperature corresponding to the melting temperature of a first polymeric material and said second heating means to a second maximum temperature corresponding to the melting temperature of a second polymeric material, wherein the first maximum temperature is different from the second maximum temperature, and wherein one of said first and second plates has a first cooling means, and wherein said control means selectively activates and cycles said first cooling means to different predetermined temperatures, while said control means simultaneously controls a pressure applied by said closure means and said first and second plates upon said materials and a dwell time thereof.

2. An apparatus according to claim 1, wherein the other of said first and second plate has a second cooling means and a second heating means and said control means selectively activates and cycles said second cooling means and second heating means to different predetermined temperatures while simultaneously controlling a pressure applied by said closure means and said first and second plates upon said materials and a dwell time thereof.

3. An apparatus according to claim 2, wherein first and second configuration enhancers are respectively mounted between said first and second plates and said first and second heating means, respectively, to evenly apply pressure to said polymeric materials from said closure means of said first and second plates.

4. An apparatus according to claim 3, wherein first and second primary heat barriers are respectively disposed between said first and second heating means and said first and second plates.

5. An apparatus according to claim 4, wherein first and second secondary heat barriers are respectively disposed between said first and second configuration enhancers and said first and second heating means.

6. An apparatus according to claim 5, wherein said first and second heating means are selected from the group consisting of a wire, a heat ribbon, a plurality of wires, a plurality of heat ribbons, a wire loosely disposed on a heat ribbon, a wire brazed to a heat ribbon, a plurality of wires brazed to a heat ribbon, and a plurality of wires brazed to a plurality of heat ribbons.

7. An apparatus according to claim 6, herein one of said first and second heating means is configured in a three dimensional shape.

8. An apparatus for electronically seam fusing polymeric materials, comprising:

a first plate having a first cooling means therein and a first heating means thereon;

a second plate spaced apart from said first plate and having a second cooling means therein and a second heating means thereon, there being polymeric materials disposed between said first and second plates;

closure means interconnecting said first and second plates for closing said first and second plates upon said polymeric materials; and control means interconnecting said first and second plates, cooling means, and heating means for selectively activating and cycling said first and second cooling means and first and second heating means between different predetermined temperatures including cycling said first heating means to a first maximum temperature corresponding to the melting temperature of a first polymeric material and said second heating means to a second maximum temperature corresponding to the melting temperature of a second polymeric material, wherein the first maximum temperature is different from the second maximum temperature, while simultaneously controlling a pressure applied by said closure means and said first and second plates upon said polymeric materials and a dwell time thereof.

9. An apparatus according to claim 8, wherein a first configuration enhancer is interposed between said first plate and said first heating means.

10. An apparatus according to claim 9, wherein a first primary heat barrier is disposed between said first heating means and said polymeric materials.

11. An apparatus according to claim 10, wherein a first secondary heat barrier is disposed between said first configuration enhancer and first heating means.

12. An apparatus according to claim 11, wherein a second configuration enhancer is interposed between said second plate and said second heating means.

13. An apparatus according to claim 12, wherein a second primary heat barrier is disposed between said second heating means and said polymeric materials.

14. An apparatus according to claim 13, wherein a second secondary heat barrier is disposed between said second configuration enhancer and second heating means.

15. An apparatus according to claim 14, wherein said first and second heating means are selected from the group consisting of a wire, a heat ribbon, a plurality of wires, a plurality of heat ribbons, a wire loosely disposed on a heat ribbon, a wire brazed to a heat ribbon, a plurality of wires brazed to a heat ribbon, and a plurality of wires brazed to a plurality of heat ribbons.

16. An apparatus according to claim 15, wherein at least one of said first and second heating means is configured in a three dimensional shape.

17. A method for electronically seam fusing polymeric materials which comprises the steps of:

inserting polymeric materials between first and second plates;

closing said first and second plates upon said polymeric materials for a predetermined period of time thereby fusing said materials together;

regulating a temperature of a first heating element disposed on said first plate;

regulating a temperature of a second heating element disposed on said second plate;

regulating a temperature of a first cooling means disposed within said first plate;

cycling said temperature of said first heating element to a first maximum temperature corresponding to the melting temperature of a first polymeric material and said second heating element to a second maximum temperature corresponding to the melting temperature of a second polymeric material, wherein said first maximum temperature is different from said second maximum temperature during said predetermined period of time;

opening said first and second plates; and removing said seam fused materials.

18. A method, as set forth in claim 17, including the additional steps of:

regulating a temperature of a second cooling means disposed within said second plate;

cycling said temperature of said first and second cooling means to a third temperature during said predetermined period of time, depending upon the fusing characteristics of said polymeric materials; and regulating a dwell time of the closure of said first and second plates.

* * * * *